US006990404B2

(12) United States Patent
Takeuchi

(10) Patent No.: US 6,990,404 B2
(45) Date of Patent: Jan. 24, 2006

(54) VEHICULAR CONTROLLER

(75) Inventor: Yoshiharu Takeuchi, Kariya (JP)

(73) Assignee: Denso Corporation, Kariya (JP)

( * ) Notice: Subject to any disclaimer, the term of this patent is extended or adjusted under 35 U.S.C. 154(b) by 30 days.

(21) Appl. No.: 10/284,359

(22) Filed: Oct. 31, 2002

(65) Prior Publication Data

US 2003/0088358 A1 May 8, 2003

(30) Foreign Application Priority Data

Nov. 2, 2001 (JP) ....................................... 2001-338210

(51) Int. Cl.
*G06F 19/00* (2006.01)

(52) U.S. Cl. ........................... 701/114; 701/33; 701/42; 701/115; 714/23; 123/395; 123/399

(58) Field of Classification Search ................. 701/114, 701/115, 33, 42; 714/23; 123/396, 399
See application file for complete search history.

(56) References Cited

U.S. PATENT DOCUMENTS

| | | | | |
|---|---|---|---|---|
| 6,243,629 | B1 | 6/2001 | Sugimoto et al. | 701/29 |
| 2003/0060964 | A1 * | 3/2003 | Ozeki et al. | 701/114 |
| 2003/0083802 | A1 * | 5/2003 | Miyano | 701/114 |

* cited by examiner

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

A vehicular engine control unit has multi-CPU configuration. A main CPU executes a control processing subject to a monitoring processing and transmits monitoring data to a sub-CPU. The sub-CPU executes the monitoring processing based on the received monitoring data. The control processing executed by the main CPU and a control characteristic may be changed or modified in accordance with an engine capacity, a vehicle equipment or the like. Similarly, the monitoring data stored in a memory connected with the main CPU is also changed in accordance with the control characteristic and the like. Therefore, the sub-CPU can be commonly used for several arrangements or the control characteristics of the main CPU.

10 Claims, 6 Drawing Sheets

VEHICULAR CONTROLLER

CROSS REFERENCE TO RELATED APPLICATION

This application is based on Japanese Patent Application No. 2001-338210 filed on Nov. 2, 2001 the contents of which are incorporated herein by reference.

BACKGROUND OF THE INVENTION

1. Field of the Invention

The present invention relates to a vehicular controller having a monitoring function, more specifically, it relates to a vehicular controller that has a control CPU and a monitoring CPU for monitoring the control CPU and for detecting an abnormal status of the control CPU.

2. Description of Related Art

A micro controller is used for a vehicular controller such as an engine control unit (ECU) for controlling operating conditions of an engine. The ECU may have a main CPU and a sub-CPU. FIG. 8 shows an arrangement of the ECU 20 that has main CPU 21 and sub-CPU 22. The main CPU 21 and the sub-CPU 22 shares engine control tasks. For example, main CPU 21 executes a fuel injection control and an ignition control. The sub-CPU 22 executes a throttle control. In the throttle control, sub-CPU 22 controls an electromagnetic actuator to operate a throttle valve a target opening degree that is determined in accordance with an operating degree of an accelerator pedal. The main CPU 21 and the sub-CPU 22 communicates with each other via an appropriate communication means such as a Universal Asynchronous Receiver Transmitter (UART), and shares data for executing respective control tasks. The CPUs 21, 22 shares data such as signals from sensors.

The main CPU 21 also executes a monitor control for monitoring status of the sub-CPU 22. For example, main CPU 21 monitors a watch dog pulse (WD pulse) from sub-CPU 22, and detects an abnormal status of die sub-CPU 22 based in deviation in periodicity of the watch dog pulse. In case of a detected abnormal status of sub-CPU 22, main CPU 21 resets sub-CPU 22.

The sub-CPU 22 also executes a monitor control for monitoring status of the main CPU 21, such as whether several control processes and communication processes are executed properly. The watch dog circuit 23 inputs a watch dog pulse from the main CPU 21, and resets the main CPU 21 if the periodicity of the watch dog pulse goes out of a proper cycle.

In order to monitor the status of the main CPU 21, sub-CPU 22 needs to hold monitoring data such as data indicative of an abnormal status or data indicative of a parameter threshold. For this purpose, for example, monitoring data may be stored in a mask ROM, and sub-CPU 22 reads out monitoring data from the mask ROM. However, the monitoring data may be varied in each engine or vehicle. Therefore, the mask ROM is inconvenient for such a variable data memory.

Alternately, the monitoring data may be preset in hardware circuits. For example, a plurality of combinations of the monitoring data may be preset in the hardware circuit, and sub-CPU 22 may select an appropriate combination out of the plurality of combinations. The hardware circuit may be arranged to output a plurality of analogue voltage signals. In such a case, only a limited number of combinations of the monitoring data are available, and additional hardware circuits such as an A/D converter and port are needed.

In addition, rapidly increasing capacity and improving processing performance of the CPU enables a single CPU to executes a plurality of control processes such as engine control and throttle valve control processes. Conventionally, the engine control process includes a fuel injection control process and an ignition control process. However, in order to ensure a reliability of throttle control, a small capacity and low performance CPU may be used as a monitoring CPU for monitoring purpose only. In such an arrangement, the same disadvantages as described above still exit.

SUMMARY OF THE INVENTION

It is an object of the present invention to provide a vehicular controller that is capable of monitoring the CPU status properly.

It is another object of the present invention to provide a vehicular controller that has a monitoring CPU capable of adapting to several control characteristics.

It is a still another object of the present invention to provide a vehicular controller that has a monitoring structure capable of being commonly used for several different control characteristics of the vehicular controller.

According to a first aspect of the present invention, a vehicular controller has a control CPU and a monitoring CPU. The control CPU transmits a monitoring data to the monitoring CPU via a communication device. The monitoring CPU stores the monitoring data in a memory device. The monitoring CPU updates the monitoring data stored in the memory device with the monitoring data received from the control CPU if the stored monitoring data is not correct. Therefore, even if the control CPU malfunctions and transmits incorrect monitoring data, the monitoring CPU keeps the monitoring data stored in the memory device unless the monitoring data stored in the memory device becomes incorrect. It is possible to ensure a reliability of the monitoring data. In addition, since the monitoring data is transmitted from the control CPU, it is easy to change or modify the monitoring data in accordance with control characteristics performed by the control CPU. The structure around the monitoring CPU, e.g., memory device may be commonly used for several arrangements of the control CPU.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
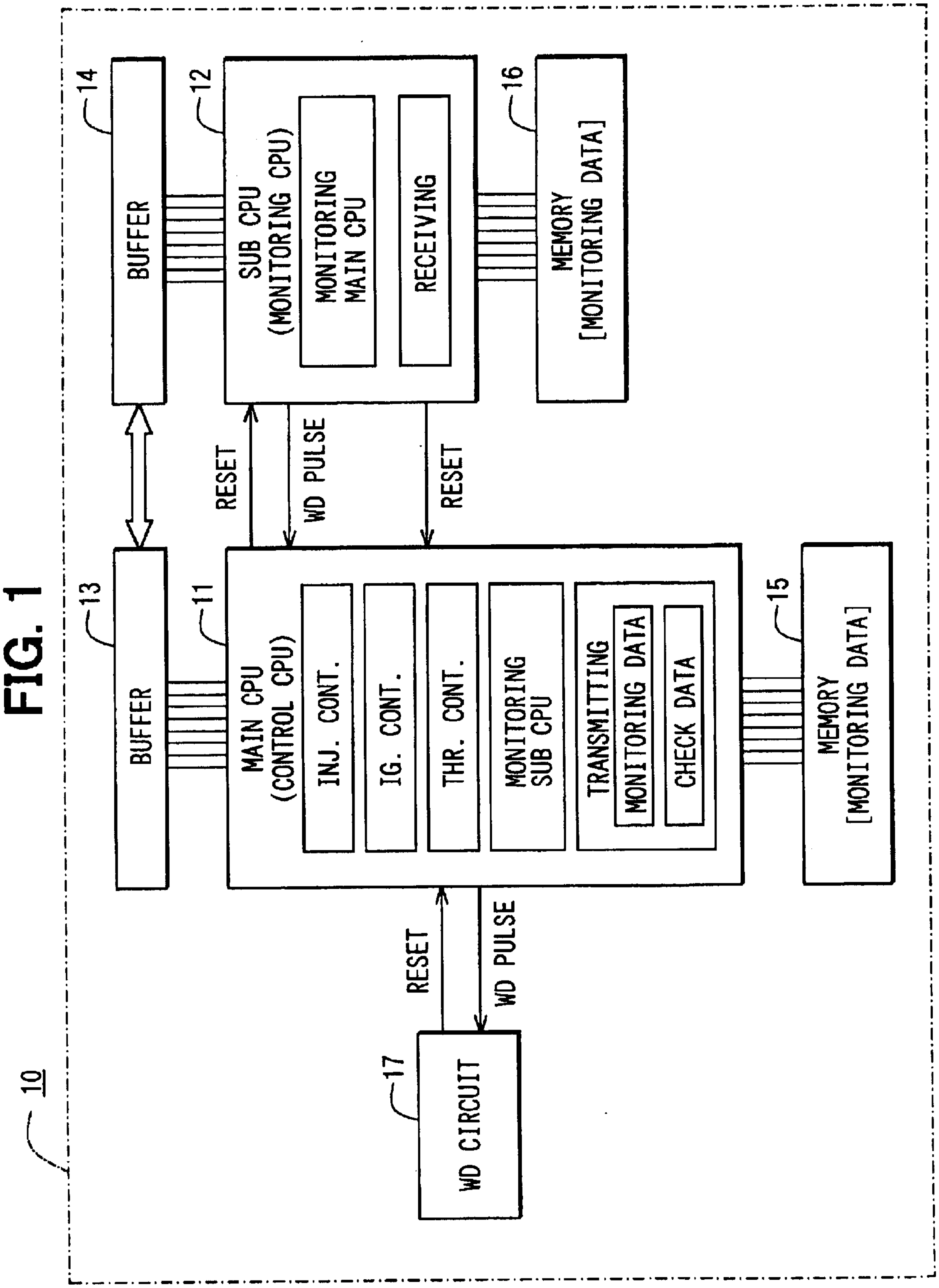
FIG. 1 is a block diagram of a vehicular controller according to a first embodiment of the present invention.

Referring to FIG. 1, a vehicular controller is mounted on a vehicle for controlling a part of vehicle component such as an engine system. The vehicular controller has a microcontroller. In this embodiment, the vehicular controller is also referred to as an electronic engine control unit (ECU) 10.

The ECU 10 executes an engine control processing such as a fuel injection control, an ignition control and a throttle valve control. In the fuel injection control, the ECU 10 determines a fuel supply amount and a fuel injection timing in accordance with sensor signals, and drives fuel injectors. In the ignition control, the ECU 10 determines a spark ignition timing in accordance with the sensor signals, and drives spark ignition circuit. In the throttle vale control, the ECU 10 determines a throttle valve opening degrees in accordance with the sensor signals and drives a throttle valve actuator such as an electromagnetic motor for rotating the throttle valve.

The ECU 10 has a main CPU 11 and a sub-CPU 12. The main CPU 11 is also referred to as a control CPU for mainly executing the engine control such as the fuel injection control, the ignition control and the throttle valve control. The sub-CPU 12 is also referred to as a monitoring CPU for executing a monitoring processing such as a monitoring processing for the throttle valve control status and a monitoring processing for the failsafe control status.

The main CPU 11 inputs the sensor signals indicative of the engine operating state such as an engine speed NE, an intake air pressure Pm, a throttle valve opening degrees TH, an accelerator pedal operating degrees. The main CPU 11 drives and controls the injectors, the ignition circuit and the throttle valve actuator. In addition, the main CPU 11 executes a monitoring processing for monitoring a status of the sub-CPU 12 performance. For this purpose, the sub-CPU 12 periodically outputs a watch dog pulse to the main CPU 11. The watch dog pulse is a cyclic pulse signal that is inverted in a predetermined interval. In the monitoring processing, the main CPU 11 monitors the watch dog pulse, and outputs a reset signal to the sub-CPU 12 if the watch dog pulse is not inverted for more than the predetermined interval.

The main CPU 11 and the sub-CPU 12 are connected via a communication device. The main CPU 11 is connected with the communication buffer 13 via a bus line. The sub-CPU 12 is connected with the communication buffer 14 via a bus line. The communication buffers 13 and 14 are connected via a communication line such as a serial communication line.

The main CPU 11 transmits several data to the sub-CPU 12. The sub-CPU 12 receives the data from the main CPU 11. The sub-CPU 12 monitors the received data and determines whether the main CPU 11 performs properly, e.g., whether the throttle valve control is executed properly. Therefore, the data subject to the communication between the CPUs includes several data indicative of status of the control executed in the main CPU 11 such as the throttle valve control. The data transmitted and received therebetween includes at least data indicative of thresholds for determining whether or not an abnormality is occurred and data indicative of status of the control or operating condition of actuators. The sub-CPU 12 outputs a reset signal to the main CPU 11 if the sub-CPU 12 detects an abnormality on the throttle valve control.

The main CPU 1 also executes a failsafe control when the abnormality is detected on the throttle valve control. For instance, in the failsafe control, the engine is controlled to limit an output power and to keep a predetermined output power that enables the vehicle a limp home drive. For example, the engine is operated with limited number of cylinders or delayed ignition timing to limit the output power but keep the engine running. The sub-CPU 12 also monitors the failsafe control. The sub-CPU 12 determines whether the failsafe control is executed properly.

The main CPU 11 is connected with a memory 15. The memory 15 stores at least monitoring data such as monitoring constants (thresholds). The monitoring data is used for the throttle valve control monitoring and for the failsafe control monitoring. For example, the monitoring data is used for determining a normal status or an abnormal status. The sub-CPU 12 is connected with a memory 16. The memory 16 also stores the monitoring data. The stored monitoring data in the memory 16 is transmitted from the main CPU 11 to the sub-CPU 12 and stored therein. The sub-CPU 12 executes the monitoring processing based on the stored monitoring data in the memory 16.

The memory 16 is a non-volatile memory that keeps stored data even the power is turned off, and is able to rewrite. For instance, a stand by RAM connected with a buck up battery or an EEPROM may be used for the memory 16. The memory 15 is also a non-volatile memory. In this embodiment, the memory 15 is a ROM for storing the monitoring data and the programs such as the throttle valve control program. The monitoring data stored in the ROM 15 is adjusted to the throttle valve control that is adapted to the vehicle or the engine. For example, the control characteristic of the throttle valve control program is adapted and adjusted in accordance with an engine capacity or engine equipments such as an alternator, and the monitoring data is also adapted and adjusted in accordance with the control characteristic of the throttle valve control.

In order to improve a reliability of the monitoring data, check data such as a mirror check data or a sum check data is also transmitted form the main CPU 11 to the sub-CPU 12. The check data is also stored in the communication buffer 14.

In addition, a watch dog circuit 17 is coupled with the main CPU 11. The main CPU 11 outputs a cyclic watch dog pulse to the watch dog circuit 17. The watch dog circuit 17 monitors the watch dog pulse, and outputs reset signal to the main CPU 11 if the watch dog pulse is not inverted for more than a predetermined interval.

The main CPU 11 transmits the monitoring data to the sub-CPU 12 in response to an initial communication event just after a power on and a periodical communication event. For example, the periodical communication is carried out every 4 milliseconds. Specifically, in this embodiment, the main CPU 11 transmits all of the monitoring data to the sub-CPU 12 at the initial communication event. The main CPU 11 transmits a divided part of the monitoring data at the periodical communication event. For example, the monitoring data is divided into three parts, and the divided parts are transmitted sequentially in a predetermined order. The communication buffer 14 temporally keeps the received monitoring data.

Figure 2:
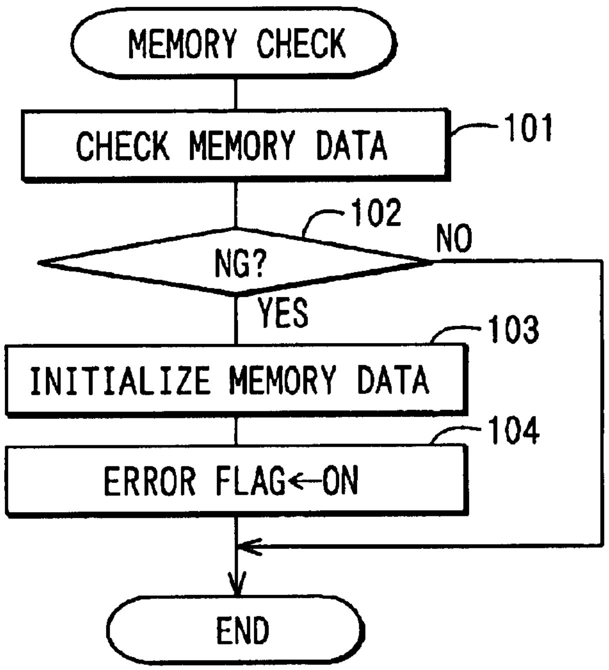
FIG. 2 is a flowchart showing a memory check processing according to the first embodiment of the present invention.

FIG. 2 shows a memory check processing executed in the sub-CPU 12. The memory check processing is executed at the initial event and executed periodically every 16 milliseconds interval.

In step 101, the sub-CPU 12 checks the stored monitoring data in the memory 16. The sub-CPU 12 determines whether or not the stored monitoring data is broken based on the check data such as the mirror check data and the sum check data. In step 102, the routine is branched in response to the result of the step 101. If the stored monitoring data is broken, the sub-CPU 12 initializes the stored monitoring data in the memory 16 in step 103, and set the error flag ON in step 104.

Figure 3:
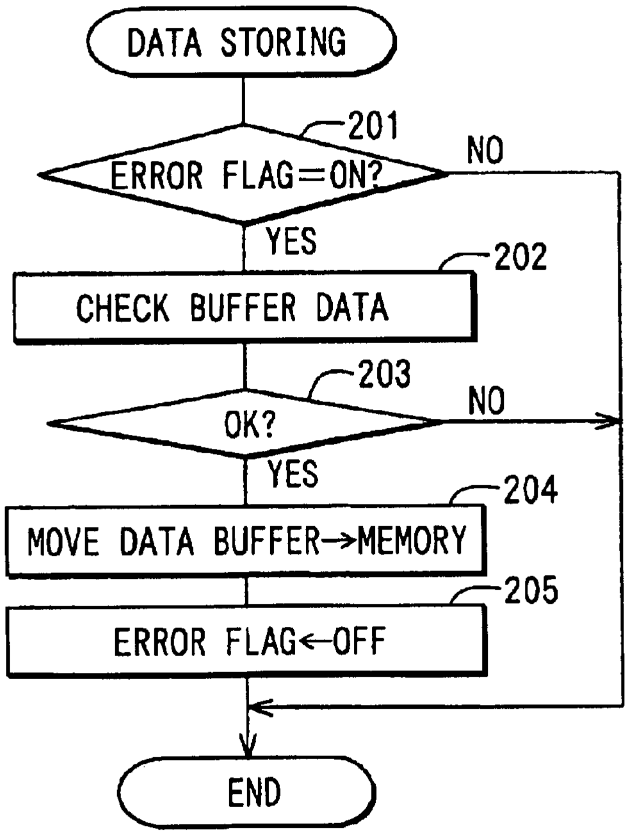
FIG. 3 is a flowchart showing a monitoring data storing processing according to the first embodiment of the present invention.

FIG. 3 shows a data storing processing executed by the sub-CPU 12 periodically every 4 milliseconds.

In step 201, the sub-CPU 12 checks the error flag. In case of ON, the sub-CPU 12 checks the buffered monitoring data in the communication buffer 14 in step 202. The buffered monitoring data is received from the main CPU 11 just before. The sub-CPU 12 checks the buffered monitoring data based on the check data that is also stored in the communication buffer 14. In step 203, the routine is branched in response to the result of the step 202. If the buffered monitoring data is incorrect, the processing jumps to the end.

If the buffered monitoring data is correct, the sub-CPU 12 transfers the buffered monitoring data to the memory 16 as the stored monitoring data in step 204, and set the error flag OFF. As a result, the monitoring data is updated or renewed only when the buffered monitoring data is correct.

If it is the first time to execute the processing shown in FIGS. 2 and 3, the error flag is turned on in step 103 since the memory 16 has no proper monitoring data, and steps 202 to 205 executes the first storing procedure.

Figure 4:
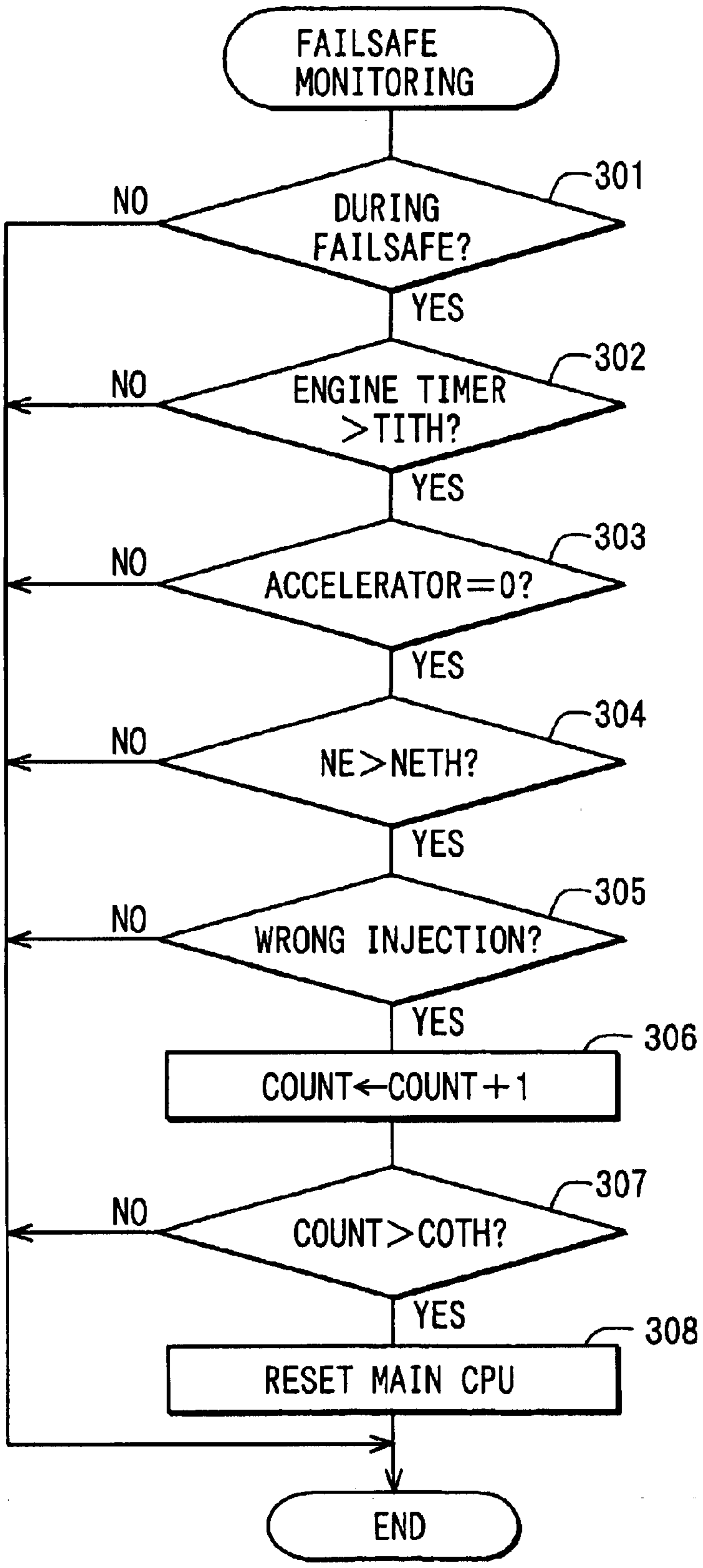
FIG. 4 is a flowchart showing a failsafe monitoring processing according to the first embodiment of the present invention.

FIG. 4 shows a failsafe monitoring processing executed by the sub-CPU 12 periodically every 16 milliseconds. Specifically, a monitoring processing for a limited cylinder operation is illustrated.

In steps 301, 302, 303, 304 and 305, several operating states of the engine are evaluated to determine whether or not the failsafe control is executed properly. In step 301, it is determined whether the main CPU 11 is executing the failsafe control. In step 302, it is determined whether a predetermined time TITH has elapsed after the engine is started by comparing a timer value with the predetermined time TITH. In step 303, it is determined whether a driver operates the accelerator pedal. In this embodiment, a predetermined threshold value is zero to evaluate the accelerator pedal operating degree. In step 304, it is determined whether the engine speed NE exceeds a predetermined engine speed NETH. In step 305, it is determined whether a proper injection sequence is carried out. For example, if a predetermined injector that should not be activated is activated, the routine branches to step 306. If all of the conditions in steps 301 to 305 are satisfied, the sub-CPU 12 increments a counter in step 306. Then, if the counter exceeds a predetermined value COTH in step 307, the routine branches to step 308, and outputs the reset signal to the main CPU 11.

In FIG. 4, the predetermined time TITH in step 302, the predetermined operating degree of the accelerator pedal in step 303, the predetermined engine speed NETH in step 304, and the predetermined count COTH in step 307 are the monitoring data.

According to the embodiment, it is possible to execute the monitoring processing properly. In addition, the sub-CPU 12 and the memory 16 can be commonly used for several different control characteristics of the main CPU 11 adapted for different engines and vehicles since the monitoring data is transmitted from the main CPU 11 to the sub-CPU 12.

The sub-CPU 12 can keep the proper and correct monitoring data, since the sub-CPU 12 updates the stored monitoring data only if the monitoring data in the memory 16 is not correct. Therefore, in case of that the CPUs 11 and 12 succeeded to transmit and receive the proper and correct monitoring data, the sub-CPU 12 keeps the data until the data stored in the memory 16 is broken or deteriorated. Therefore, it is possible to keep the monitoring data that was transmitted from the main CPU 11 when the main CPU 11 still performs properly and normally, and to avoid storing the monitoring data that was transmitted from the main CPU 11 after the main CPU 11 becomes malfunctioning or abnormal. The sub-CPU 12 can keep the reliable monitoring data.

It is possible to monitoring the failsafe control properly.

It is possible to avoid excessive increase of communication load between the CPUs 11 and 12, since the main CPU 11 divides the monitoring data and transmits the divided parts periodically. In addition, it is possible to avoid a delay of starting the monitoring processing since the main CPU 11 transmits all the monitoring data in the first communication event. The sub-CPU 12 can receives all the monitoring data in the first communication event.

It is possible to improve reliability of the monitoring data transmitted via the communication device, since the sub-CPU 12 can check the received monitoring data based on the check data generated and transmitted from the main CPU 11 with the monitoring data.

Second Embodiment

The second embodiment employs similar structure of the ECU 10 as shown in FIG. 1. But, the CPUs 11 and 12 executes partially different processing for updating the monitoring data. Hereinafter, the differences are mainly explained.

In the second embodiment, the sub-CPU 12 requests the main CPU 11 to transmit the monitoring data if the stored monitoring data in the memory 16 is not correct.

Figure 5:
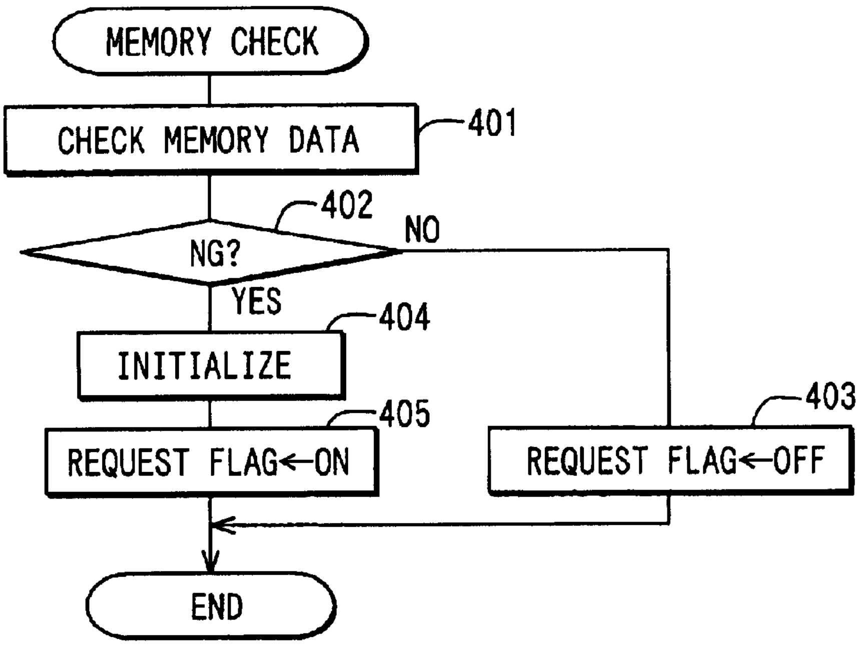
FIG. 5 is a flowchart showing a memory check processing according to a second embodiment of the present invention.

FIG. 5 shows a memory check processing executed in the sub-CPU 12 periodically every 16 milliseconds. In step 401, the sub-CPU 12 checks the stored monitoring data in the memory 16 based on the check data such as the mirror data and the sum data. In step 402, the routine branches in response to the result of step 401. If the stored monitoring data is correct, a request flag is set OFF in step 403. If the stored monitoring data is not correct, the sub-CPU 12 initialize the stored monitoring data in the memory 16 in step 404, and sets the request flag ON in step 405. Further, the sub-CPU 12 executes the processing shown in FIGS. 3 and 4 too.

The request flag is transmitted to the main CPU 11 in a regular communication processing. For instance, the request flag is notified to the main CPU 11 periodically.

Figure 6:
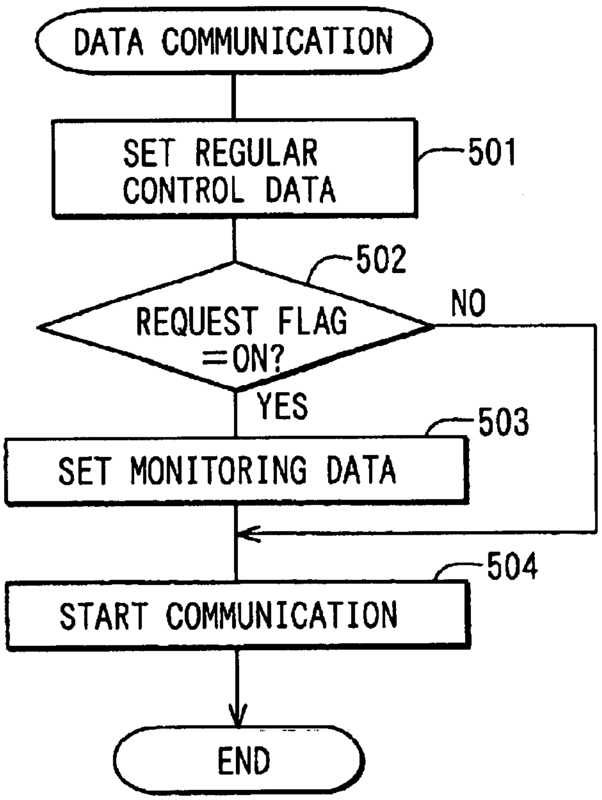
FIG. 6 is a flowchart showing a data communication processing according to the second embodiment of the present invention.

FIG. 6 shows a data communication processing executed in the main CPU 11 periodically every 4 milliseconds. In step 501, the main CPU 11 sets a regular control data in the communication buffer 13 to transmit to the sub-CPU 12. The regular control data is regularly transmitted to the sub-CPU 12 whenever the CPUs 11 and 12 perform normally. In step 502, the main CPU 11 checks the request flag. If the request flag is OFF, the main CPU 11 activates a communication procedure for transmitting the buffered data to the sub-CPU 12. If the request flag is ON, the main CPU 11 additionally sets the monitoring data stored in the memory 15 to the communication buffer 13. Then, the main CPU 11 activates the communication procedure in step 504. As a result, the main CPU 11 transmits the monitoring data only if the request flag is set ON in the sub-CPU 12.

According to the second embodiment, it is possible to reduce the communication load in comparison with the first embodiment, since the monitoring data is transmitted in response to the request flag.

Third Embodiment

The third embodiment employs similar structure of the ECU 10 as shown in FIG. 1. But, the CPU 12 executes partially different processing for initially storing the monitoring data. Hereinafter, the differences are mainly explained.

In the third embodiment, the sub-CPU 12 resets or halts the main CPU 11 if the proper and correct monitoring data is not received in the initial communication event.

Figure 7:
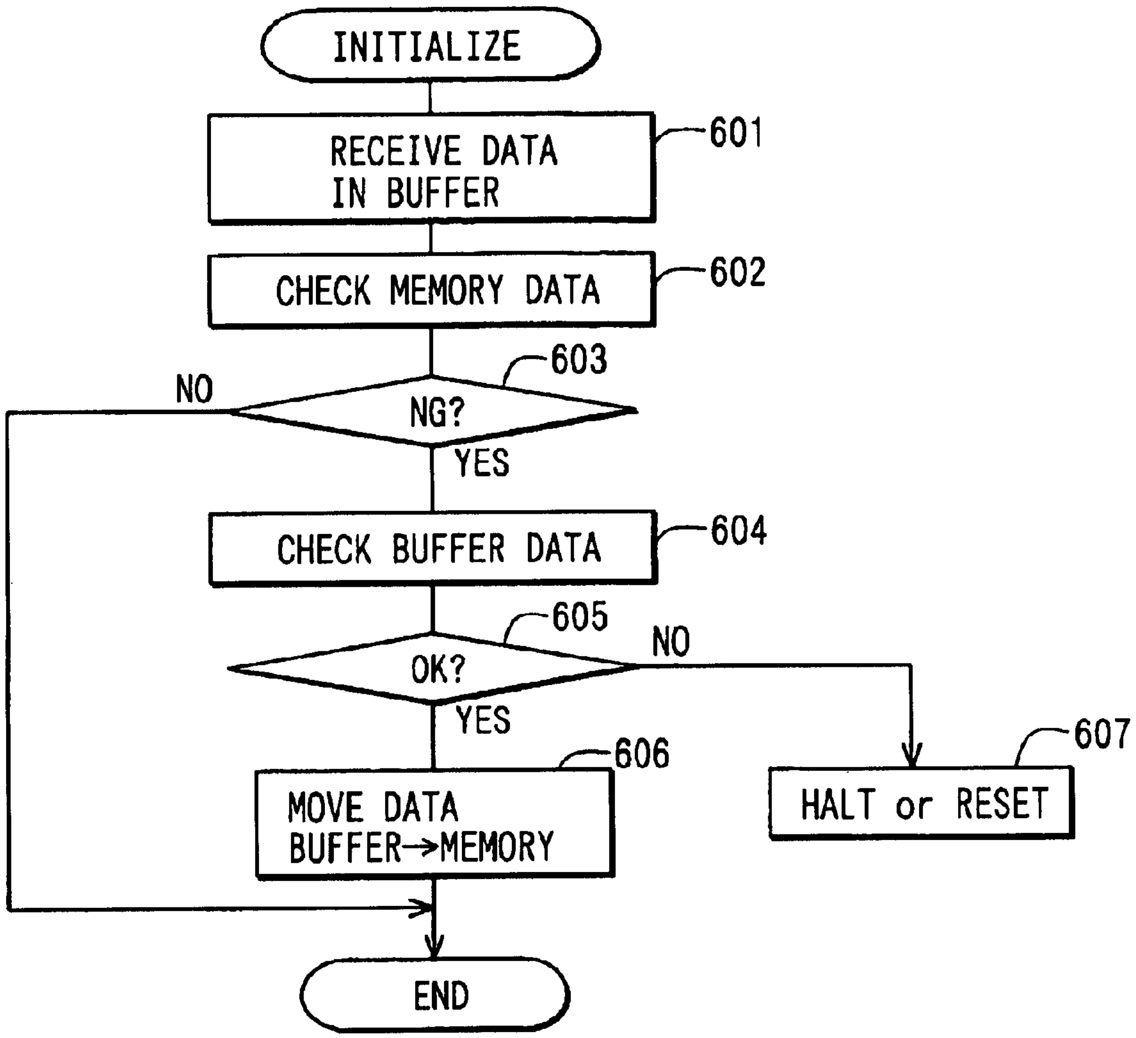
FIG. 7 is a flowchart showing an initialize processing according to a third embodiment of the present invention.

FIG. 7 shows an initial processing of the data storing processing executed by the sub-CPU 12 in the first (initial) communication event caused by a power on. In this embodiment, the initial communication event occurs when the ECU 10 is first activated since assembled by turning on the power supply. In step 601, the sub-CPU 12 receives the monitoring data in the buffer 14 from the main CPU 11. The sub-CPU 12 checks the stored monitoring data in the memory 16 based on the check data stored in the memory 16. If the result is not correct, the routine proceeds to step 604. Usually, in the first communication event, the memory 16 has no proper monitoring data, therefore the routine branches to step 604. If it is the second time activation of the system, the memory 16 may have the proper and correct monitoring data, therefore, the routine may jumps. If the stored monitoring data is broken or deteriorated, the routine proceeds to step 604.

In step 604, the sub-CPU 12 checks the buffered monitoring data based on the check data buffered in the communication buffer 14. In step 605, the routine branches in response to the result of step 604. If the buffered monitoring data is correct, the sub-CPU 12 moves the buffered monitoring data to the memory 16 as the stored monitoring data in step 606. Therefore, the memory 16 stores the proper and correct monitoring data. If the buffered monitoring data is not correct, the sub-CPU 12 halts all of the following processing in the sub-CPU 12 and the main CPU 11, and stops the engine. The sub-CPU 12 may output the reset signal to the main CPU 11 to initiate the main CPU 11. The sub-CPU may suspend the following processing in the main CPU 11 only, and continues to execute the processing in the sub-CPU 12 itself. As a result, it is possible to prevent the engine from improper control.

According to the third embodiment, it is possible to ensure to receive the proper and correct monitoring data even in the first activation of the system. Therefore, it is possible to execute proper monitoring processing just after the first activation of the ECU 10.

Figure 8:
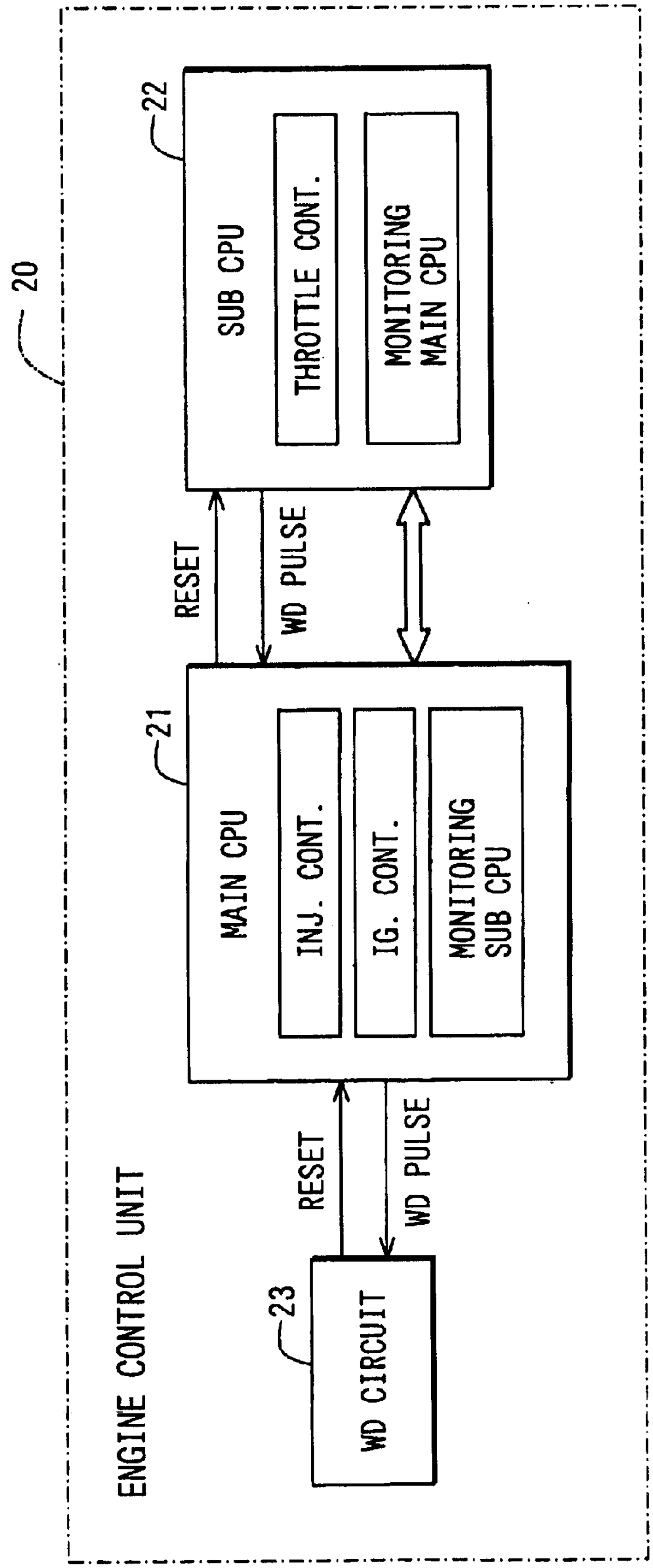
FIG. 8 is a block diagram of a vehicular controller according to a related art.

In addition to the above embodiments, the sub-CPU may execute a part of the engine controls such as the throttle valve control as shown in FIG. 8. In this case, the main CPU 21 executes the monitoring processing for monitoring the throttle valve control executed in the sub-CPU 22. The sub-CPU 22 executes the failsafe control monitoring processing for monitoring the failsafe control executed by the main CPU 21. The sub-CPU 22 updates the stored monitoring data only when the stored monitoring data in the memory 16 is improper or incorrect. In this case, it is possible to monitor the CPU performance based on the reliable monitoring data. The present invention is effective for an ECU that has multi-CPU arrangement in which at least one monitoring CPU monitors another monitored CPU based on the monitoring data that is transmitted from the monitored CPU to the monitoring CPU.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A vehicular controller for controlling a vehicular component, the vehicular controller comprising:

a control CPU that executes control processing for the vehicular component;

a monitoring CPU that executes monitoring processing for the control CPU;

a communication device provided between the control CPU and the monitoring CPU; and a memory device that is connected with the monitoring CPU and stores monitoring data for monitoring the control CPU, wherein the control CPU transmits monitoring data to the monitoring CPU, and the monitoring CPU updates monitoring data stored in the memory device with the monitoring data transmitted from the control CPU when the monitoring data stored in the memory device is not correct.

2. A vehicular controller as in claim 1, wherein:

the communication device includes a buffer for temporally storing monitoring data received from the control CPU, and the monitoring CPU moves monitoring data in the buffer to the memory device.

3. A vehicular controller as in claim 1, wherein the control CPU executes an engine control for an engine.

4. A vehicular controller as in claim 1, wherein:

the control CPU executes an engine control for an engine and a failsafe control that control engine torque under an abnormal status, and the monitoring CPU monitors status of the failsafe control executed in the control CPU.

5. A vehicular controller as in claim 1, wherein:

the control CPU transmits an entire set of monitoring data at an initial communication event caused by a power on event, and transmits a divided part of an entire set of monitoring data at a periodic communication event.

6. A vehicular controller as in claim 1, wherein:

the monitoring CPU requests the control CPU to transmit monitoring data if monitoring data stored in the memory is not correct, and the control CPU transmits monitoring data to the monitoring CPU in response to the request from the monitoring CPU.

7. A vehicular controller as in claim 2, wherein:

the monitoring CPU suspends processing if monitoring data stored in the memory is not correct after receiving monitoring data in an initial communication event caused by a power on event.

8. A vehicular controller as in claim 2, wherein:

the monitoring CPU resets the control CPU if monitoring data stored in the memory is not correct after receiving monitoring data in an initial communication event caused by a power on event.

9. A vehicular controller as in claim 1, wherein the memory device is a non-volatile memory that is capable of keeping memory without power supply.

10. A vehicular controller as in claim 1, wherein:

the control CPU transmits monitoring data and check data that enables a determination of whether or not the monitoring data is correct.

* * * * *

UNITED STATES PATENT AND TRADEMARK OFFICE

CERTIFICATE OF CORRECTION

PATENT NO. : 6,990,404 B2
DATED : January 24, 2006
INVENTOR(S) : Takeuchi, Y.

It is certified that error appears in the above-identified patent and that said Letters Patent is hereby corrected as shown below:

Title page,
Item [75], Inventors, add -- Yasuhiro Tanaka, Nisshin (JP) --.

Column 8,
Line 58, add the following claims 11-20,

11. A method for operating a vehicular controller for controlling a vehicular component, said method comprising:

executing control processing for the vehicular component in a control CPU;

executing monitoring processing in a monitoring CPU for the control CPU;

providing a communication device between the control CPU and the monitoring CPU; and providing a memory device that is connected with the monitoring CPU and stores monitoring data for monitoring the control CPU, wherein the control CPU transmits monitoring data to the monitoring CPU, and the monitoring CPU updates monitoring data stored in the memory device with monitoring data transmitted from the control CPU when the monitoring data stored in the memory device is not correct.

12. A method as in claim 11 wherein:

the communication device includes a buffer for temporally storing monitoring data received from the control CPU, and the monitoring CPU moves monitoring data in the buffer to the memory device.

13. A method as in claim 11 wherein the control CPU executes an engine control for an engine.

14. A method as in claim 11 wherein:

the control CPU executes an engine control for an engine and a failsafe control that control engine torque under an abnormal status, and the monitoring CPU monitors status of the failsafe control executed in the control CPU.

15. A method as in claim 11 wherein:

the control CPU transmits an entire set of monitoring data at an initial communication event caused by a power of event, and transmits a divided part of an entire set of monitoring data at a periodic communication event.

UNITED STATES PATENT AND TRADEMARK OFFICE
CERTIFICATE OF CORRECTION

PATENT NO. : 6,990,404 B2
DATED : January 24, 2006
INVENTOR(S) : Takeuchi, Y.

It is certified that error appears in the above-identified patent and that said Letters Patent is hereby corrected as shown below:

<u>Column 8 (cont'd),</u>

16. A method as in claim 11 wherein:
the monitoring CPU requests the control CPU to transmit monitoring data if monitoring data stored in the memory is not correct, and
the control CPU transmits monitoring data to the monitoring CPU in response to the request from the monitoring CPU.

17. A method in claim 12 wherein:
the monitoring CPU suspends processing if monitoring data stored in the memory is not correct after receiving monitoring data in an initial communication caused by a power on event.

18. A method as in claim 12 wherein:
the monitoring CPU resets the control CPU if monitoring data stored in the memory is not correct after receiving monitoring data in an initial communication event caused by a power on event.

19. A method as in claim 11 wherein the memory device is a non-volatile memory that is capable of keeping memory without power supply.

20. A method as in claim 11 wherein:
the control CPU transmits monitoring data and check data that enables a determination of whether or not the monitoring data is correct.

Signed and Sealed this

Ninth Day of May, 2006

JON W. DUDAS
*Director of the United States Patent and Trademark Office*